Patented July 4, 1933

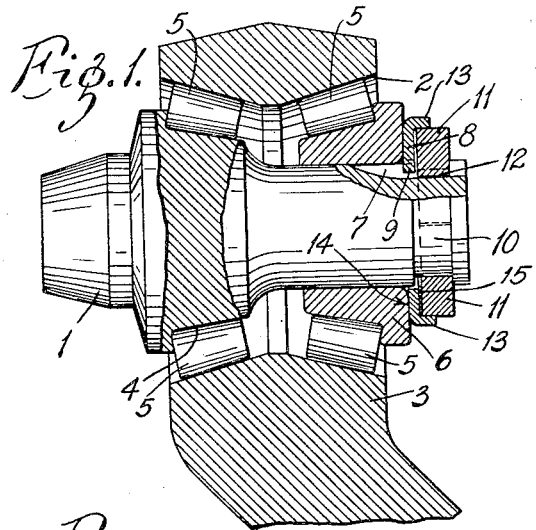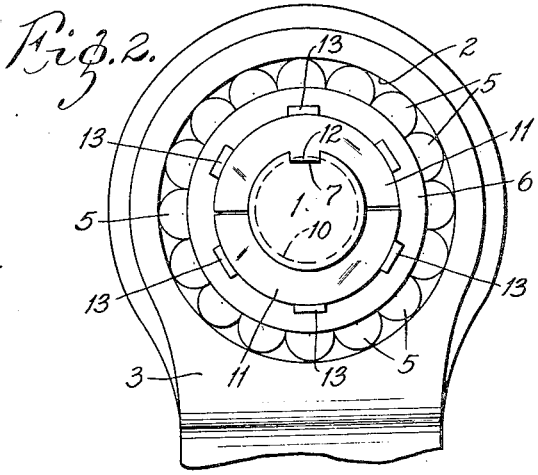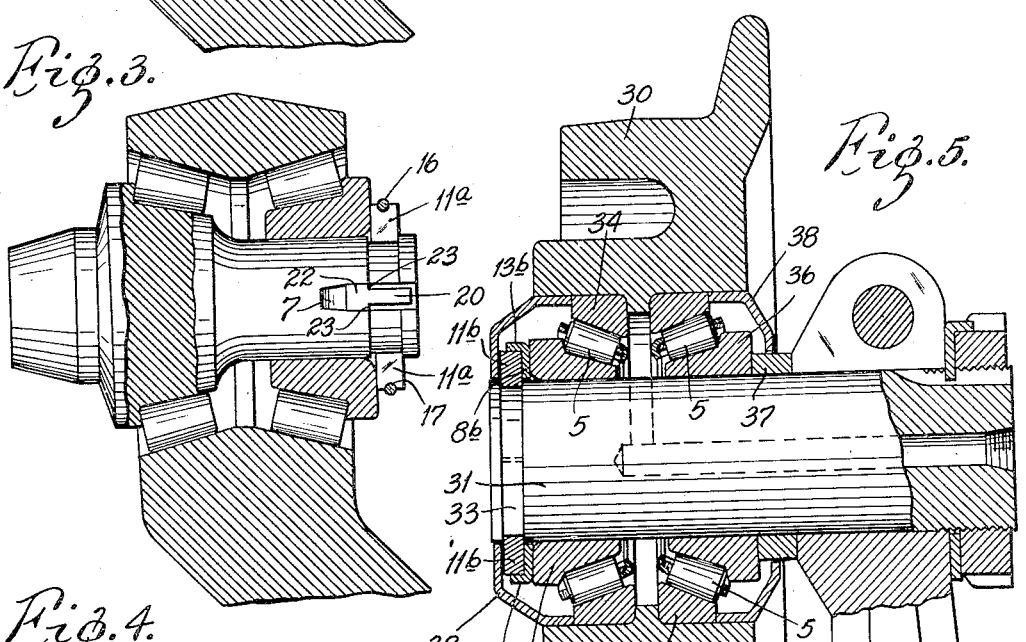

1,916,233

UNITED STATES PATENT OFFICE

ROBERT M. RIBLET, OF CANTON, OHIO, ASSIGNOR TO THE TIMKEN ROLLER BEARING COMPANY, OF CANTON, OHIO, A CORPORATION OF OHIO

BEARING POSITIONING MEANS

Application filed June 16, 1932. Serial No. 617,564.

My invention relates to the positioning of bearings on shafts, pins and the like, particularly to the positioning of the inner bearing members of roller bearings.

The invention has for its principal object to provide a positioning means that is easily positioned and removed and that permits adjustment of the bearings.

The invention consists principally in a bearing positioning means including a two-piece ring mounted in an annular groove on the shaft on which the bearing is mounted and provided with a tongue engaging a longitudinal groove in said shaft to prevent rotation of said two-piece retaining ring. The invention further consists in the bearing positioning means and in the parts and combinations and arrangements of parts hereinafter described and claimed.

In the accompanying drawing, which forms part of this specification and wherein like reference characters indicate like parts wherever they occur, Fig. 1 is a longitudinal sectional view of the contact pin of a steering gear and its mounting piece, showing a bearing positioning means embodying my invention applied to said pin, Fig. 2 is an end view, Fig. 3 is a sectional view similar to Fig. 1, showing a slight modification of the invention, Fig. 4 is an end view of the construction shown in Fig. 3, and Fig. 5 is a sectional view through a trolley wheel construction, one of whose bearings is provided with a removable abutment similar to the positioning means illustrated in Fig. 1.

In Fig. 1 is illustrated a steering gear contact pin 1 mounted in a transverse opening 2 through a rocker shaft arm 3. Said pin 1 has formed thereon a conical raceway 4 for one series of bearing rollers 5 and has mounted thereon a separate cone or inner bearing member 6 for the other series of rollers 5. The outer raceways for said rollers 5 are formed in the bore 2 of said arm 3.

My invention is concerned with the securing of said separate inner bearing member 6 on said pin 1. Said pin 1 is provided with a longitudinal groove 7 extending from the outer end to a point somewhat inwardly of the end of the inner bearing member 6. Abutting against said inner bearing member 6 is a washer 8 having a tongue 9 projecting into said groove 7, whereby rotation of said washer 8 is prevented. The pin 1 is provided near its outer end with an annular groove 10 shallower than the longitudinal groove 7. Mounted in said annular groove 10 are half-ring members 11, one of which is provided with a tongue 12 extending into said longitudinal groove 7. In order to hold said half-ring members 11 on said pin 1, said washer 8 is provided with a plurality of prongs 13 that may be bent over the outer periphery of said half-ring members 11. Preferably, the face 14 of the washer in contact with the inner bearing member is hardened, as by cyanizing.

The washer 8 and ring members 11 hold the inner bearing member 6 in position. Adjustment of said inner bearing member 6 is obtained either by using a washer 8 or rings 11 of different thickness or by inserting shims 15, as shown in Fig. 1.

In the construction shown in Figs. 3 and 4, the washer 8 is eliminated, the two half-ring members 11a being held in place by an annular spring 16 disposed in a peripheral groove 17 in said ring members 11. The inner periphery of each ring member 11a is free from projecting portions and a key 20 fitting in the longitudinal groove 7 of the pin 1 and in a groove or keyway 21 in one half-ring member 11a prevents said assembled ring member from rotating on said pin. Said key 20 has an enlarged head portion 22 forming shoulders 23 that prevent the key from slipping out of said longitudinal groove 7. Adjustment of this bearing is obtained either by using shims or by using ring members of different thickness.

Fig. 5 illustrates a trolley wheel construction including a trolley wheel 30 rotatably mounted upon a stub shaft 31 held in a suitable supporting arm 32. At one end of said shaft 31 is an annular groove 33 in which are mounted half-ring members 11b held in place by means of a washer 8b having prongs 13b bent over the periphery of said ring members 11b. Said washer 8b constitutes an abutment for a cone or inner bearing member 6b on which are mounted rollers 5 that cooperate with a cup 34 mounted in the bore of said trolley wheel 30. A second cup 35 mounted in said trolley wheel bore cooperates with a second series of rollers 5 mounted on a second cone 36 or inner bearing member. Said second cone 36 is held in place by means of a suitable ring 37. Closures 38 are provided for the ends of the trolley wheels. In this construction, the half-rings 11b are an abutment or positioning device, not an adjusting device.

My invention is easily applied and removed and the construction shown in Fig. 5 eliminates the necessity of an expensive machining operation to form an abutment shoulder on a shaft. Rings of desired size may easily be made and by selecting rings of proper thickness, adjusting shims may be dispensed with, although the device also has the advantage of facilitating the mounting of adjusting shims in position.

What I claim is:

A bearing positioning means comprising a shaft having a seat for an inner bearing member, said shaft having a longitudinal groove extending outwardly from said seat for said inner bearing member and having an annular groove communicating with said longitudinal groove, half-rings mounted in said annular groove, one of said half-rings having a tongue projecting into said longitudinal groove, and a washer interposed between said half-ring members and said seat for said inner bearing member, said washer having prongs engaging the outer periphery of said half-ring members to hold them in place and also having a tongue extending into said longitudinal groove.

Signed at Canton, Ohio, this 11th day of June, 1932.

ROBERT M. RIBLET.